Sept. 20, 1932. C. W. SHERMAN 1,877,999
SHOCK ABSORBER FOR DRAFT GEARS
Filed June 18, 1928 4 Sheets-Sheet 1
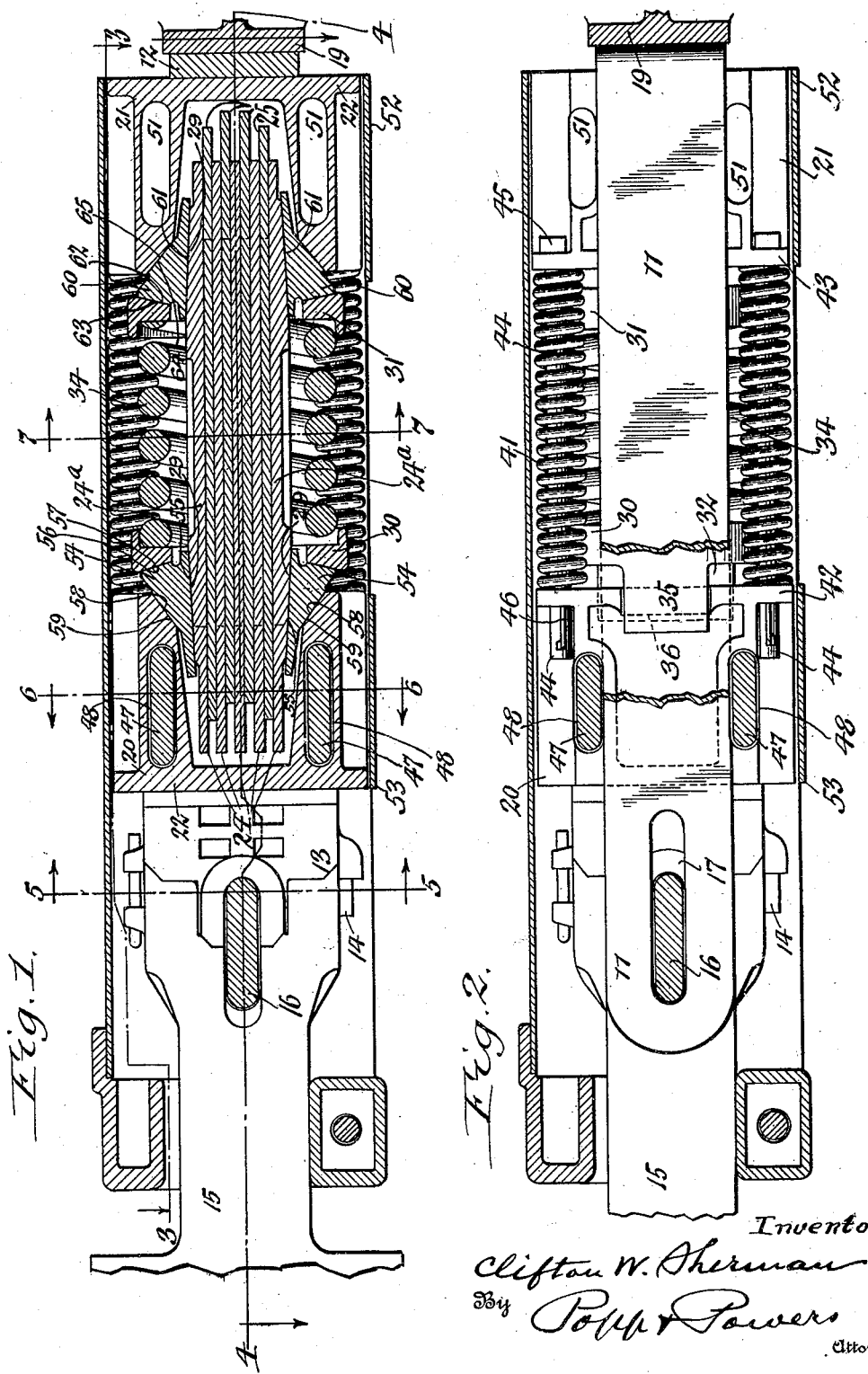
Inventor
Clifton W. Sherman
By Popp & Powers
Attorneys Sept. 20, 1932. C. W. SHERMAN 1,877,999
SHOCK ABSORBER FOR DRAFT GEARS
Filed June 18, 1928 4 Sheets-Sheet 2
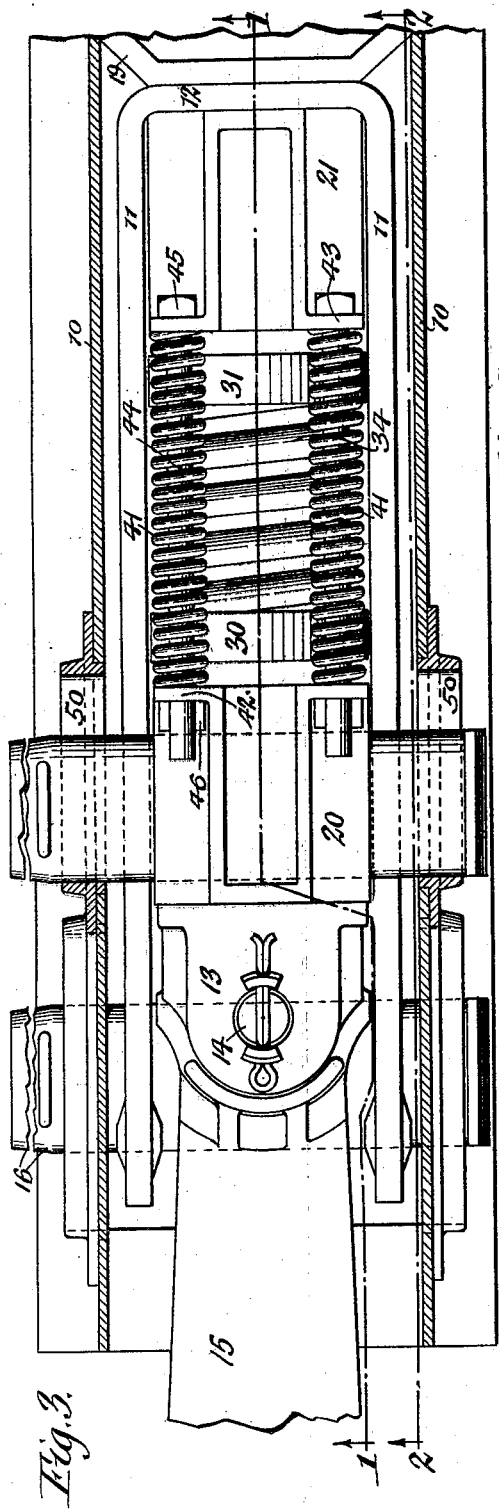
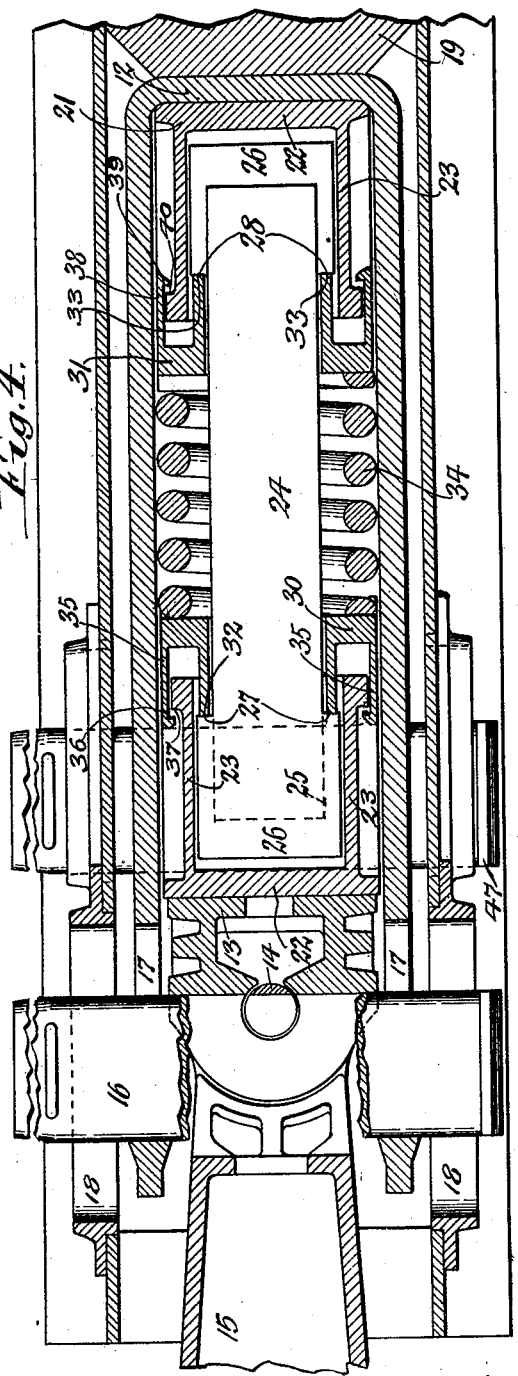

Sept. 20, 1932.　　　C. W. SHERMAN　　　1,877,999
SHOCK ABSORBER FOR DRAFT GEARS
Filed June 18, 1928　　　4 Sheets-Sheet 3

Inventor
Clifton W. Sherman
By Popper Powers
Attorneys

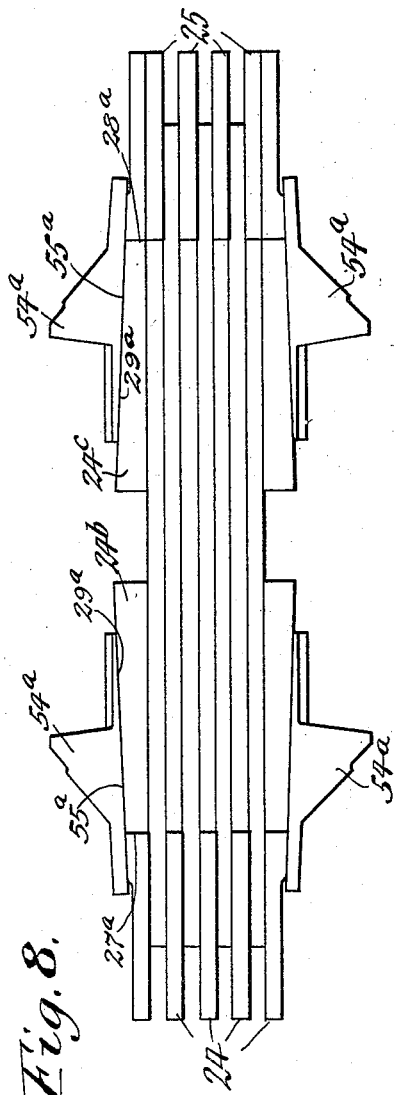
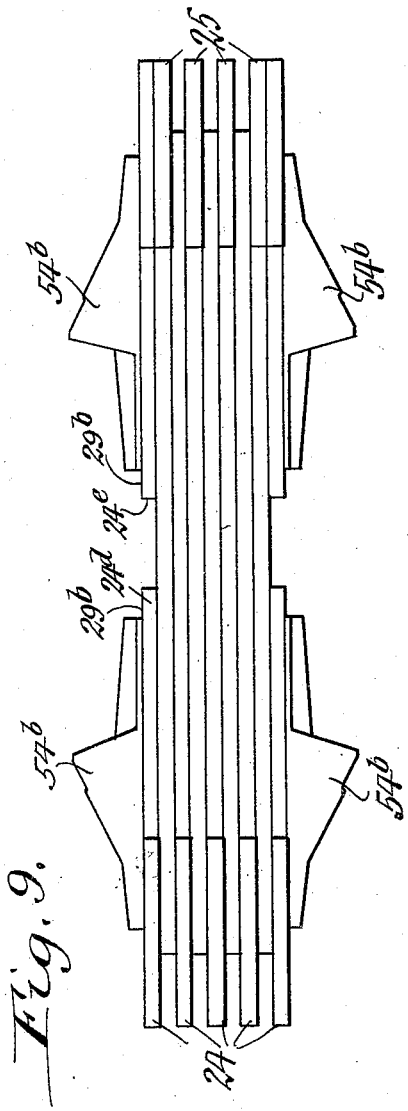

Patented Sept. 20, 1932

1,877,999

UNITED STATES PATENT OFFICE

CLIFTON W. SHERMAN, OF HAMILTON, ONTARIO, CANADA

SHOCK ABSORBER FOR DRAFT GEARS

Application filed June 18, 1928. Serial No. 286,095.

This invention relates to that type of shock absorbers which is more particularly designed for cushioning the shock of very heavy loads, such as railway cars, and in which a plurality of sets of intercalated friction plates are employed which slide lengthwise relatively to one another during the compression of the mechanism and absorb the load principally by frictional resistance.

The objects of this invention are to improve the means for pressing together the multiple friction plates and cause said pressure creating means to act easier and more effectively; also to so organize the mechanism that the clearance between the followers and the friction plates can be readily varied to suit the desired capacity of the absorber; and also to so regulate the travel of the mechanism that an easy action of the gear is permitted during the main part of the closing stroke and a high resistance is produced during the final part of the compression stroke in order to reduce the possibility of the gear becoming solid.

In the accompanying drawings:

Figures 1 and 2 are vertical longitudinal sections taken on lines 1—1 and 2—2 Fig. 3 respectively, and is a satisfactory embodiment of my invention in one form of shock absorber.

Figure 3 is a top plan view of the shock absorber, partly in section, the sectional part being taken on line 3—3 Fig. 1.

Figure 4 is a horizontal section taken on line 4—4 Fig. 1.

Figures 8 and 9 are side elevations representing modified forms of the wedge plates which are arranged on opposite sides of the pack of friction plates, and the wedge shoes engaging with the wedge plates.

In the following description similar characters of reference indicate like parts in the several figures of the drawings.

Figure 5:
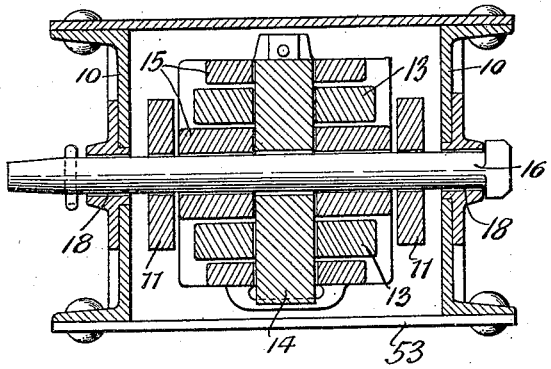
Figures 5, 6 and 7 are vertical transverse sections taken on the correspondingly numbered lines in Fig. 1, and looking in the direction of the arrows associated with these lines.

Although this improved shock absorber may be embodied in the draft gears of railway cars which may vary in construction, the same in the present case is shown in connection with a draft gear which is constructed essentially as follows:

The numeral 10 represents the longitudinal draft sills of the draft gear which are arranged lengthwise on the underside of the car body but spaced apart and practically forming elements of the lower part of the car frame.

Between the front parts or outer ends of these car sills is arranged a longitudinal movable yoke or yoke strap which in the preferred construction consists of two longitudinal side bars 11 arranged lengthwise along the inner sides of the sills, and a cross bar 12 connecting the rear ends of these side bars, as shown in Figs. 3 and 4.

Between the front ends of the yoke side bars 11 is arranged a coupling block 13 and to this block is pivoted by means of a vertical pin 14 the rear end of the shank 15 of the coupler or draw bar whereby one car is coupled with another. The front end of this yoke, the coupling block 13, and the rear end of the shank 15 are supported so as to be capable of sliding lengthwise but held against vertical displacement by means of a main supporting key 16 which passes horizontally and transversely through the front part of the coupling block 13, the rear part of the shank 15, the front part of the pivot pin 14, and also through the longitudinal slots 17 formed in the front parts of the yoke side bars 11 and through longitudinal slots 18 formed in the adjacent front parts of the car sills 10.

The backward or inward movement of the yoke is limited by engagement of its cross bar 12 with a rear or inner stop 19 arranged between the car sills 10 and secured thereto in any suitable manner.

The longitudinal slots 18 of the car sills are sufficiently long so that the main coupling key 16 is free to move forwardly and rearwardly from its central or neutral positions the requisite extent when a pulling or buffing load is applied to the coupler and the draft rigging.

The slots 17 in the yoke side bars are of such length and so constructed that in the neutral or normal positions of the parts the key 16 engages with the front end of the slots 17 and the cross bar 12 of the yoke engages with the rear stop 19, and when a buffing load is applied to the car coupler the yoke will remain stationary and the key 16 will move inwardly or rearwardly in the slots 17 of the yoke, but during a pulling load upon the coupler the main key 16, by engaging with the front ends of the slot 17, will move the yoke forwardly and away from the rear stop 19.

Due to this construction the rear cross bar 12 of the yoke remains stationary and the coupling block 13 moves rearwardly toward the yoke cross bar during a buffing action, but during a pulling action on the gear both the coupling block 13 and the yoke cross bar 12 move forwardly together.

The preferred form of shock absorber forming the subject of this invention and associated with the parts of the draft rigging just described is constructed as follows:

The numeral 20 represents a front follower and the numeral 21 a rear follower which are arranged between the side bars of the yoke and each of which is made in the form of a hollow casing or shell which opens inwardly toward the other follower and is provided with an outer transverse head 22 and a peripheral side wall 23 projecting inwardly from the head 22. The head 22 of the front follower bears against the rear end of the coupling block 13 and the head 22 of the rear follower 21 bears against the front side of the cross bar 12 of the yoke, as shown in Fig. 4.

In the space between the side bars of the yoke and projecting at their opposite ends into the hollow followers is a central pack of friction plates 24, 25 which are arranged in the form of two sets or groups which are intercalated with each other and are slidable lengthwise relatively to one another with their opposing flat sides in engagement. Each of these friction plates is constructed substantially in the form of the letter T and the narrow inner parts of these friction plates overlap one another while the wide outer parts of the friction plates of one set normally project outwardly beyond the inner or narrow parts of the friction plates of the other set.

As shown in Figs. 1 and 4 of the drawings, the wide heads 26 of the front set of plates 24 and the narrow inner ends of the rear set of plates 25 are arranged within the hollow front follower 20, and the wide outer ends 26 of the rear set of plates and the inner ends of the narrow parts of the front set of plates 24 are arranged within the hollow rear follower 21. The enlarged outer ends 26 on the front set of plates 24 produce inwardly facing shoulders 27 within the front follower 20 on opposite longitudinal edges of this set of friction plates, and the enlarged outer ends 26 of the rear set of friction plates form inwardly facing shoulders 28 on opposite longitudinal edges thereof within the follower 21.

The outermost friction plates or shoe plates of the two sets or groups forming the pack, which in this case are the outer plates 24a of the front set, are made somewhat thicker than the remaining plates and each of these outermost plates 24a is provided on its outer side adjacent to opposite ends thereof with an incline 29, the arrangement of which is such that the corresponding inclines 29 of the two shoe friction plates 24a diverge inwardly from the outer ends of the respective outermost plates, as shown in Fig. 1. Adjacent to the inner ends of the front and rear followers are arranged spring seats or spring followers 30 and 31, the front spring seat 30 being provided on its opposite sides adjacent to the edges of the friction plates with outwardly projecting restoring lugs 32 which extend into the adjacent spaces between the longitudinal edges of the friction plates and the wall of the front follower 20 and are adapted to engage with the inwardly facing shoulders 27 of the front set of friction plates, and the rear spring seat 31 is likewise provided on its opposite sides with outwardly projecting restoring lugs 33 which extend into the adjacent spaces between the edges of the friction plates and the wall of the follower 21 and are adapted to engage with the inwardly facing shoulders 28 of the rear set of friction plates.

Surrounding the central part of the pack of friction plates and between the central parts of the yoke side bars 11 is arranged a main resistance spring 34 which is comparatively heavy and bears at its front and rear ends against the inner sides of the front and rear spring seats or spring followers 30, 31, as shown in Figs. 1 and 4.

On the opposite edges of the front spring seat 30 the same is provided with forwardly projecting drag lugs 35, each of which is arranged between the outer side of the wall of the front follower 20 and the inner side of the adjacent yoke side bar 11 and is provided with a rearwardly facing shoulder 36 which is adapted to engage with a forwardly facing shoulder 37 on the outer side of the adjacent part of the wall of the front follower 20. Similarly the rear spring seat 31 is provided on its opposite sides with rearwardly projecting drag lugs 38, each of which is arranged between the outer side of the wall of the rear follower 21 and the adjacent part of one of the yoke side bars, and is provided with a forwardly facing shoulder 39 which is adapted to engage with a rearwardly facing shoulder 40 on the adjacent part of the rear follower wall.

Between the front and rear followers is arranged a spring resistance which in addition to absorbing part of the load when the gear is subjected to a compression, also serves to release the gear and permit the several parts to move into their open, released or neutral position. In the preferred form of this release spring mechanism the same consists of a plurality of comparatively light releasing springs 41, preferably four in number, two of which are arranged lengthwise above the main spring on opposite sides of the longitudinal center of the gear and the other two below the main spring on opposite sides of the longitudinal center of the gear.

Each of these releasing springs bears at its opposite ends against lugs 42, 43 projecting laterally from the inner parts of the front and rear followers 20, 21, as best shown in Figs. 2 and 3.

The separation of these followers is limited when compression upon the gear is removed by stop means which also serve to hold the releasing springs in their operative position, these stop means for this purpose consisting preferably of a plurality of stop rods 44 each of which passes lengthwise through one of the releasing springs 41 and a pair of lugs 42, 43 on the front and rear followers, and is provided at one end with a head 45 bearing against the outer side of one of these lugs, and a key 46 at its opposite end bearing against the outer side of the respective lug on the other follower.

During the operation of this shock absorber the front and rear followers 20, 21 move lengthwise between the sills of the car and during such movement, the same may be supported and guided in any suitable manner, for example the front follower 20 may be slidingly supported on the sills by means of transverse horizontal keys 47 passing through horizontal transverse openings 48, 48 formed in the upper and lower parts of the front follower, and along the upper and lower edges, respectively, of the adjacent parts of the yoke side bars 11 and through longitudinal slots 50 in the sills 10, as shown in Figs. 1, 2 and 4.

If desired, similar keys may be employed for supporting the rear follower 21 by passing such keys through horizontal transverse openings 51 in the upper and lower parts of the rear follower and extending such keys along the upper and lower sides of the yoke sides bars and through longitudinal slots in the sills of the frame similar to the slots 50 which receive the keys 47.

Figure 7:
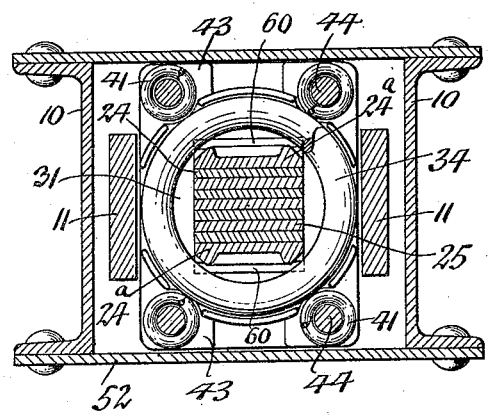

In the preferred construction the rear follower 21 is supported so as to permit the same to move lengthwise during the operation of the shock absorber by means of a plate 52 arranged along the underside of the rear follower and engaging therewith, and secured at its opposite ends to the lower part of the frame sills 10, as best shown in Figs. 1, 2 and 7.

Figure 6:
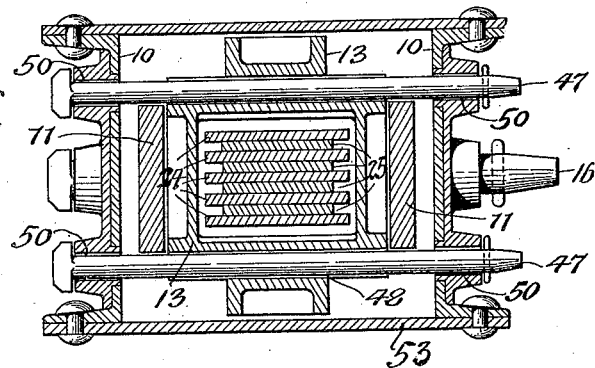

If desired, a similar horizontal plate 53 may be arranged underneath the front follower 20 and in engagement therewith and secured at its opposite ends to the lower edges of the car sills 10, as shown in Figs. 1, 2 and 6, and thereby assist the keys 47 in guiding or slidingly supporting the front follower during its longitudinal movement.

The numeral 54 represents two front wedge shoes or members which are arranged on opposite sides of the front end of the pack of friction plates and each of which is provided with an inner longitudinal incline 55 engaging with the incline 29 on the front part of one of the wedge plates 24a, a transverse incline 56 engaging with an incline 57 on the outer side of the front spring seat 30 and an inclined face 58 engaging with an inclined face 59 on the adjacent part of the inner end of the front follower 20. The inclined faces 55 of the two front wedge shoes diverge rearwardly at a comparatively sharp angle, the inclined faces 58 of these shoes diverge rearwardly at a considerably greater angle than the inclines 55, and the angles of the cooperating inclined surfaces 56, 57 of the front wedge shoes converge rearwardly, and are relatively obtuse compared with the angles of the cooperating inclined faces 58, 59.

The numeral 60 represents two rear wedge shoes which are arranged on opposite sides of the pack of friction plates, and each of these rear shoes is provided with an inner longitudinal inclined surface 61 which engages with the adjacent inclined surface 29 of the respective wedge friction plates, an inner inclined face 62 engaging with the correspondingly inclined face 63 on the adjacent part of the rear spring seat 31, and an inclined face 64 engaging with the correspondingly inclined face 65 on the adjacent part of the inner end of the rear follower 21. The angles of the cooperating inclined surfaces 61 and 29 are comparatively steep and the two inclined surfaces 61 of the two rear shoes 60 diverge forwardly, the angles of the cooperating inclines 62, 63 are relatively obtuse, the inclined surfaces 62 of the rear shoes converge forwardly, and the angles of the cooperating surfaces 64, 65 are relatively acute and diverge inwardly or forwardly at a greater angle than the surfaces 61 and 29.

The operation of this shock absorber is as follows:

In the fully expanded condition of the shock absorber the front keys 47 bear against the front ends of the slot 50 in the car sills 10 and the rear cross bar 12 of the yoke bears against the rear stop 19 of the car body, as shown in Fig. 4.

In this fully expanded position of the shock absorber the return lugs 32, 33 of the spring seats, by engaging with the shoulders 27 and 28 of the friction plates have withdrawn these two sets of plates apart lengthwise as far as possible, and in this position of these plates the outer ends of each set of plates is separated by an intervening gap from the adjacent inner surface of the respective head 22 of the adjacent follower, as shown in Figs. 1 and 4.

Upon now subjecting the shock absorber to a buffing or pushing load which will cause the front follower 20 to move rearwardly toward the rear follower 21, which latter at this time is stationary, the initial part of this rearward movement of the front follower will be effected independently of the friction plates. During the first part of this rearward movement of the front follower independent of the friction plates, the head 22 thereof takes up the slack between the same and the outer ends of the front set of friction plates, and thereafter this head 22 of the front follower engages the outer ends of the front set of friction plates so that during the continued rearward movement of the front follower the front set of plates moves rearwardly therewith.

While the front follower is moving rearwardly independently of the friction plates, the cooperating inclined surfaces 58 and 59 produce a wedging effect between the front follower and the front pair of wedge shoes 54, whereby the latter are moved transversely inward toward the longitudinal axis of the shock absorber, which inward movement is, however, yieldingly resisted by the main spring 34. While the front follower is thus acting on the front pair of wedge shoes and moving them transversely inward these shoes are also moved to a moderate extent lengthwise inwardly or rearwardly on the outermost friction plates or shoe plates 24a of the pack, whereby an additional inward wedging effect of these shoes is produced on the pack of friction plates due to the cooperation of the inclined surfaces 29 and 55 so that the friction plates are now pressed together more tightly and a much greater frictional contact is produced between the same so that a much greater load will be required to move one set of plates lengthwise relatively to the other.

After the two sets of friction plates have been thus pressed tightly together by the wedge action of the cooperating inclines between the front shoes and the front ends of the wedge plates and front follower, these plates move rearwardly in a mass until the outer ends of the rear set of friction plates also engage with the head 22 of the rear follower. While the mass of plates is thus moved rearwardly en masse, the cooperating inclines between the rear pair of wedge shoes and the rear parts of the friction shoe plates 24a and the rear follower cause the rear part of the pack of plates to be pressed transversely inward, and thereby increase the frictional grip of the friction plates upon one another throughout the rear part of the pack the same as in the front part thereof.

As the front follower continues its rearward movement after the same engages the front ends of the front set of friction plates and the rear ends of the rear set of friction plates engage with the head 22 of the rear follower, the front set of plates is moved longitudinally rearward relatively to the rear set of friction plates, which latter at this time are stationary. As the two sets of friction plates at this are pressed together crosswise of the gear, the same offer a high frictional resistance in opposition to such movement, whereby the shock of the load which produces this relative movement of the parts is absorbed.

This frictional grip between the two sets of friction plates increases as the backward movement of the front follower and front set of plates progresses toward the rear follower and rear set of plates, inasmuch as this continued rearward movement causes the cooperating inclined surfaces between the several members at the front and rear ends of the gear to increase their wedging effect and thereby increase the intensity of the pressure under which the friction plates are pressed together, thereby gradually increasing the frictional shock absorbing capacity of the gear as the load which produces this pressure increases.

In addition to this frictional resistance the rearward movement of the front follower is spring-resisted by the releasing springs which are interposed between the followers and also by the main spring 34 which is interposed between the spring seats 30, 31 due to the fact that when this gear is compressed the front follower moves toward the rear follower and the front spring seat 30 is moved rearwardly toward the rear spring seat 31.

When the load which produced the compression of the gear is relaxed or removed, the first effect is that the releasing springs 41 will move the front follower forwardly and thereby relieve the wedging effect of the front follower on the front wedge shoes, and thereby permit the latter to move transversely outward away from opposite sides of the friction plates at the front ends thereof. When this release of the front friction shoes against the friction plates occurs, the main spring 34 is permitted to expand and push the front spring seat forwardly.

During this forward movement of the front set of friction plates the frictional contact of the same with the rear set of friction plates causes the latter to be moved forwardly and away from the head 22 of the rear follower 21, but this forward movement of the rear set of friction plates is arrested upon engagement of the shoulders 28 thereof with the return lugs 33 of the rear spring follower or spring seat 31.

At the same time the rear set of friction shoes 60 move forward slightly due to the frictional drag and the lowering of the pressure of the main spring 34 against the same so that the grip between the several friction plates at the rear end thereof is reduced. As a result, the continued forward releasing movement of the front follower 20 under the action of the releasing springs 41 which is immediately followed by the coincident expansion of the main spring 34, causes the front spring seat 30 to push the front shoes 54 forwardly and at the same time pull the front set of friction plates forwardly relatively to the rear set of friction plates until the parts reach their fully expanded position, represented in Figs. 1-4.

During such movement of the front set of friction plates there is still a substantial frictional engagement of the same with the rear set of friction plates so that the opening or releasing of the gear is effected gradually instead of suddenly, thereby avoiding any injurious effect on the gear or the rigging or the cargo in the car.

If, during the release of the gear the two sets of friction plates should stick together to such an extent that they cannot be pulled apart readily by the expansion of the main spring 34 then the expansion of the releasing springs 41 is utilized to aid the main spring, inasmuch as the forwardly facing shoulders 37 of the front follower under such conditions will engage the rearwardly facing shoulders 36 on the front spring seat 30, and thereby aid the main spring 34 in moving the front spring seat forwardly, so that now the combined effect of the main and releasing springs operates upon the shoulders 27 of the front set of friction plates and thereby moves the same forward.

During the first part of this forward movement the plates stick together and the front and rear sets of friction plates move together, until the shoulders 39 of the rear spring seat 31 engage with the shoulders 40 of the rear follower, but after engagement of the shoulders just mentioned the rear set of friction plates is held against further forward movement due to the engagement of the shoulders 28 with the lugs 33 on the rear spring seat 31, and thereafter the front set of friction plates is moved forwardly into its foremost position independently of the rear set of friction plates.

When the shock absorber is subjected to a pulling action during which the yoke is moved forwardly by the coupler, the rear follower 21 and associated parts are moved forwardly relative to the front follower 20 and associated parts, and during such action a transverse wedge pressure is produced upon the multiple friction plates in exactly the same manner in which this was accomplished during a buffing or pulling action, the only difference being that during a pulling action the operation of the parts is reversed to that described with reference to the operation when a buffing or pushing action occurs. The release of the gear after a pulling action is also identical with that described with reference to the release after a buffing action, excepting that this releasing operation after the pulling action is reverse to that of the releasing operation which follows a buffing action.

The relative arrangement and organization of the several parts is preferably such so that the maximum load which is likely to be imposed upon the shock absorber will be absorbed frictionally and before the full stroke of the gear has been exhausted, thereby preventing the heads 22 of the followers from engaging with opposite ends of the friction plates which otherwise would cause the gear to go solid and produce a racking effect to some extent on the car and the cargo carried therein.

The intensity of the frictional grip of the friction plates one upon another cross-wise of the gear can be varied by increasing or decreasing the extent of the idle movement of the front and rear followers relatively to the front and rear friction plates. This may be accomplished by increasing or decreasing the distance between the outer ends of the friction plates and the inwardly facing shoulders 27, 28 on the margins thereof.

When this distance is made comparatively short, the gap between the outer end of each set of friction plates and the head of the corresponding follower will be increased so that an increase in the transverse inward pressure against the several plates will occur before the friction plates are moved lengthwise relatively to each other, and thereby increase the frictional shock absorbing capacity of the same.

Upon increasing the distance between the shoulders 27, 28 on the enlarged ends of the friction plates and the outer ends thereof, the gap between the outer ends of the sets of friction plates and the heads of the followers is reduced, thereby reducing the extent of the idle movement of the followers relatively to the friction plates before the latter are engaged and thereby also reducing the wedge action upon the friction plates whereby the latter are pressed together so that a reduction in the frictional resistance of the plates relatively to one another results therefrom.

In the construction of the gear, shown in Fig. 1, each of the outermost friction plates 24a is made in one piece and the same is provided adjacent to its opposite ends with the inclined surfaces 29 which are engaged by the longitudinal inclined surfaces of the wedge shoes.

If desired, each of the outermost friction plates may be divided into two sections 24b, 24c and these wedge sections may be provided respectively with outer inclined surfaces 29a which are engaged by the inner inclined surfaces 55a of the adjacent wedge shoes 54a, as shown in Fig. 8.

In such an organization each section of the divided outer wedge friction plate is provided with individual inwardly facing shoulders 27a, 28a for engagement by the return lugs 32 and 33 of the front and rear spring seats 30 and 31.

In another modified form of this invention each of the outermost friction plates of the pack may be split into two sections 24d and 24e, each of which is provided on its outer side with a surface 29b which is parallel with the cooperating surfaces of the several friction plates instead of being arranged at an angle thereto, as shown in Fig. 9, in which construction the wedging effect upon the friction plates for pressing them together is due entirely to the cooperation of the inclines between the followers and the wedge shoes 54b.

During the release of the gear the lateral movement of the shoes for reducing the inward pressure against the friction plates is facilitated by the comparatively flat inclined cooperating surfaces 56, 57 and 62, 63 between the wedge shoes and the opposing spring seats, thereby insuring a prompt release of the gear.

By varying the angles of the inclined cooperating surfaces between the shoes and the followers and the spring seats it is possible to predetermine the gripping effect of the friction plates one upon another, as best suits a particular purpose or character of work which the shock absorber is intended to perform.

By employing a differential angle in the wedging engagement of the wedge shoes with the followers and the spring seats it is possible to obtain a greater lateral travel of the shoes and an increased frictional resistance on the wedging angle surface. This facilitates release of the gear at the front and rear ends of the same, inasmuch as one angle at each end is self-releasing when all the pressure is relieved.

This organization of shock absorber permits of producing a draft gear which has a sufficient wedging capacity to do considerable work with a reduced movement of the plates, in other words—by so constructing the gear that it is possible to vary the end clearance between the plates and the followers, this permits the wedge shoes to travel a greater extent during the initial part of travel during the compression stroke, and then reaches its maximum capacity during the final portion of this travel.

Inasmuch as it requires about thirty times as much force to overcome friction between bodies at rest as compared with the force required to overcome friction between bodies which are in motion, the present improvement is highly advantageous in connection with intercalated multiple plate gears by the wedging and frictional engagement of the cooperating inclined surfaces of the shoes and outermost friction plates. This will be apparent when it is understood that there is a tendency for the shoes to travel inwardly in a straight line with the wedging housing which however is overcome by the slight lateral travel which is imparted to the shoes by reason of their secondary wedging engagement with the outermost friction plates.

By this means the frictional resistance of the followers to the wedge shoes, while the latter are at rest, is offset due to slight taper of the inclined surfaces on the outermost friction plates which are engaged by the cooperating inclines of the wedge shoes. It follows from this construction that when a follower is moved longitudinally inward the wedge shoes will be forced laterally or transversely outward from the friction plates and longitudinally inward from the respective followers, thereby breaking down the high frictional resistance which exists between these parts when the same are at rest.

While I have shown and described the well-known horizontal yoke construction for draft gears, vertical yokes of the so-called A. R. A. type using front sill stops can be used, thus eliminating the front keys through the draft gears and into the sills, and using coupler key only.

Although I have shown these release springs bearing on the opposed follower members in all the illustrations, it will be noticed that the angle of engagement between each shoe and its housing can be made more abrupt, thus forming a self-releasing draft gear in combination with intercalated plates.

It follows from this that the angular engagement of each shoe with the respective shoe friction plate and follower may vary considerably, the angle of engagement between the shoe and the shoe friction plate being comparatively flat and therefore high in wedging effect, while the angle of engagement of the shoe with the follower is comparatively steep and therefore low in wedging effect, but practically self-releasing upon relaxing the load on the gear and thus permitting the same to expand freely after compression.

I claim as my invention:—

A shock absorber comprising a plurality of sets of intercalated friction plates which are slidable lengthwise relatively to one another, front and rear followers each having a transverse plate adapted to engage the outer ends of one set of friction plates and slotted parts extending from each of said transverse plates lengthwise along the opposite sides of the respective end of the sets of friction plates, transverse pressure creating means whereby upon movement of one of said followers toward the other said friction plates are pressed together and upon movement of one of said followers away from the other the transverse pressure upon said friction plates is reduced, means for guiding said followers on the sills of a car including keys passing through said slotted parts, and means for causing said sets of friction plates to be drawn apart during release of the mechanism.

In testimony whereof I hereby affix my signature.

CLIFTON W. SHERMAN.